(12) United States Patent
Washio et al.

(10) Patent No.: US 12,197,031 B2
(45) Date of Patent: Jan. 14, 2025

(54) LENS DRIVING DEVICE, CAMERA DEVICE AND ELECTRONIC APPARATUS

(71) Applicant: New Shicoh Motor Co., LTD, Zhejiang (CN)

(72) Inventors: Noriyuki Washio, Yamato (JP); Tomoyoshi Yano, Yamato (JP)

(73) Assignee: New Shicoh Motor Co., LTD, Zhejiang (CN)

( * ) Notice: Subject to any disclaimer, the term of this patent is extended or adjusted under 35 U.S.C. 154(b) by 525 days.

(21) Appl. No.: 17/548,935

(22) Filed: Dec. 13, 2021

(65) Prior Publication Data

US 2022/0206247 A1 Jun. 30, 2022

(30) Foreign Application Priority Data

Dec. 29, 2020 (CN) .............................. 202011602098

(51) Int. Cl.
| | |
|---|---|
| *G02B 7/09* | (2021.01) |
| *G02B 27/64* | (2006.01) |
| *G03B 5/02* | (2021.01) |
| *G03B 13/36* | (2021.01) |

(52) U.S. Cl.
CPC .............. *G02B 7/09* (2013.01); *G02B 27/646* (2013.01); *G03B 5/02* (2013.01); *G03B 13/36* (2013.01); *G03B 2205/0007* (2013.01); *G03B 2205/0069* (2013.01)

(58) Field of Classification Search
CPC ........ G02B 27/646; G02B 7/09; G02B 13/36; G02B 5/02; G02B 5/00
See application file for complete search history.

(56) References Cited

U.S. PATENT DOCUMENTS

| | | | |
|---|---|---|---|
| 2018/0031859 A1* | 2/2018 | Gomyo | G03B 5/04 |
| 2020/0174270 A1* | 6/2020 | Enta | G02B 7/08 |
| 2022/0019127 A1* | 1/2022 | Saito | G03B 5/00 |

FOREIGN PATENT DOCUMENTS

| | | |
|---|---|---|
| CN | 101840046 A | 9/2010 |
| CN | 111983775 A | 11/2020 |
| JP | 2006134998 A | 5/2006 |
| JP | 2019139223 A | 8/2019 |
| JP | 2020024381 A | 2/2020 |
| JP | 2020060801 A | 4/2020 |
| JP | 2020190655 A | 11/2020 |
| WO | 2020122047 A1 | 6/2020 |

* cited by examiner

*Primary Examiner* — Ephrem Z Mebrahtu
(74) *Attorney, Agent, or Firm* — Hayes Soloway PC

(57) ABSTRACT

A lens driving device includes a carrier with an attachment portion for attaching a lens body and a base comprising a resin main body and a metal plate member embedded in the resin main body and movably supporting the carrier. An opening portion is provided in a center of the resin main body and the metal plate member is provided so as to block the opening portion. In the opening portion, the carrier directly opposes to the metal plate member.

21 Claims, 7 Drawing Sheets

LENS DRIVING DEVICE, CAMERA DEVICE AND ELECTRONIC APPARATUS

CROSS-REFERENCE TO RELATED APPLICATIONS

This application claims the benefit of Chinese Patent Application No. 202011602098.X, filed Dec. 29, 2020, which is hereby incorporated by reference herein in its entirety.

TECHNICAL FIELD

The present disclosure relates to a lens driving device used in electronic apparatus such as smartphones, a camera device and an electronic apparatus.

BACKGROUND

Some lens driving devices among the lens driving device that have both OIS (Optical Image Stabilizer) function and AF (Auto Focus) function are called periscopic type. In a periscopic lens driving device, a lens body and an image sensor are arranged side by side in a direction orthogonal to the incident direction of light from a subject, and the light from the subject is reflected by a prism or a mirror, transmitted through the lens body, focused on the image sensor, and converted into an image signal by the image sensor. As a document disclosing a technique related to this type of lens driving device, Japanese Patent Application Laid-Open No. 2019-139223A (hereinafter referred to as Patent Document 1) can be given. The lens driving device disclosed in Patent Document 1 has a fixed portion, a movable portion, an elastic element, and a driving assembly. The fixed portion has a housing, a base, a frame, and a circuit element. The movable portion has a carrier. The circuit element sends an electric signal to control a driving assembly, and the lens driving device performs an OIS function and an AF function.

SUMMARY

In a conventional periscopic lens driving device, the base is formed of resin, and the area directly under the lens body, which requires particularly thinness, is gouged out. However, in such a structure, the strength is insufficient, so there is a problem that it is difficult to thin the base.

The present disclosure has been made in view of such a problem, and the present disclosure aims to provide a lens driving device in which the base can be thinned in the periscopic type.

In order to solve the above-described mentioned problem, in accordance with a first aspect of the present disclosure, there is provided a lens driving device including: a carrier with an attachment portion for attaching a lens body; and a base having a resin main body and a metal plate member embedded in the resin main body and movably supporting the carrier, wherein an opening portion is provided in a center of the resin main body, the metal plate member is provided so as to block the opening portion, and in the opening portion, the carrier directly opposes the metal plate member.

In accordance with a second aspect of the present disclosure, there is provided a camera device including the lens driving device described above.

In accordance with a third aspect of the present disclosure, there is provided an electronic apparatus including the camera device described above.

Further features of the present invention will become apparent from the following description of exemplary embodiments (with reference to the attached drawings).

DETAILED DESCRIPTION

Figure 1:
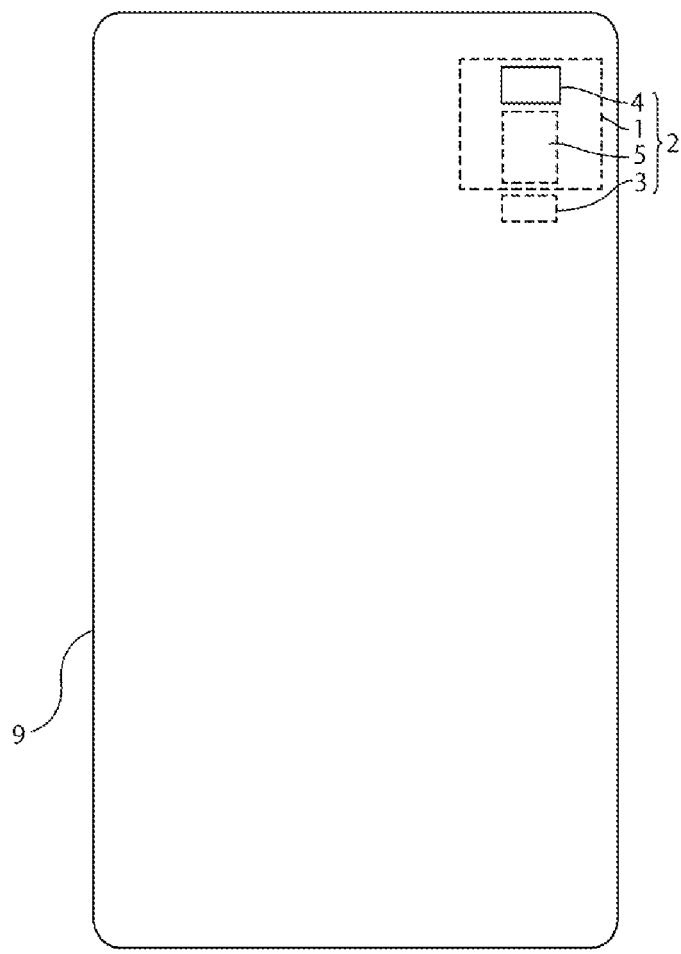
FIG. 1 is a front view of a smartphone on which a camera device including a lens driving device according to one embodiment of the present disclosure is mounted.

Hereinafter, embodiments of the present disclosure are explained with reference to drawings. As shown in FIG. 1, a camera device 2 including a lens driving device 1 according to one embodiment of the present disclosure is accommodated in a smartphone 9.

The camera device 2 has an image sensor 3, a mirror 4 that reflects light from a subject, a lens body 5 that guides the light reflected by the mirror 4 to the image sensor 3, and a lens driving device 1 that drives the lens body 5.

As shown in FIGS. 2 to 5, hereinafter, a direction in which the light from the subject is incident is appropriately referred to as a Y direction. Further, one direction in which the light reflected by the mirror 4 is directed toward the lens body 5 is referred to as an X direction, and a direction orthogonal to the Y direction and the X direction is referred to as a Z direction. Further, the +Y side may be referred to as an upper side, the −Y side may be referred to as a lower side, the +X side may be referred to as a rear side, the −X side may be referred to as a front side, the +Z side may be referred to as a left side, and the −Z side may be referred to as a right side.

Figure 3:
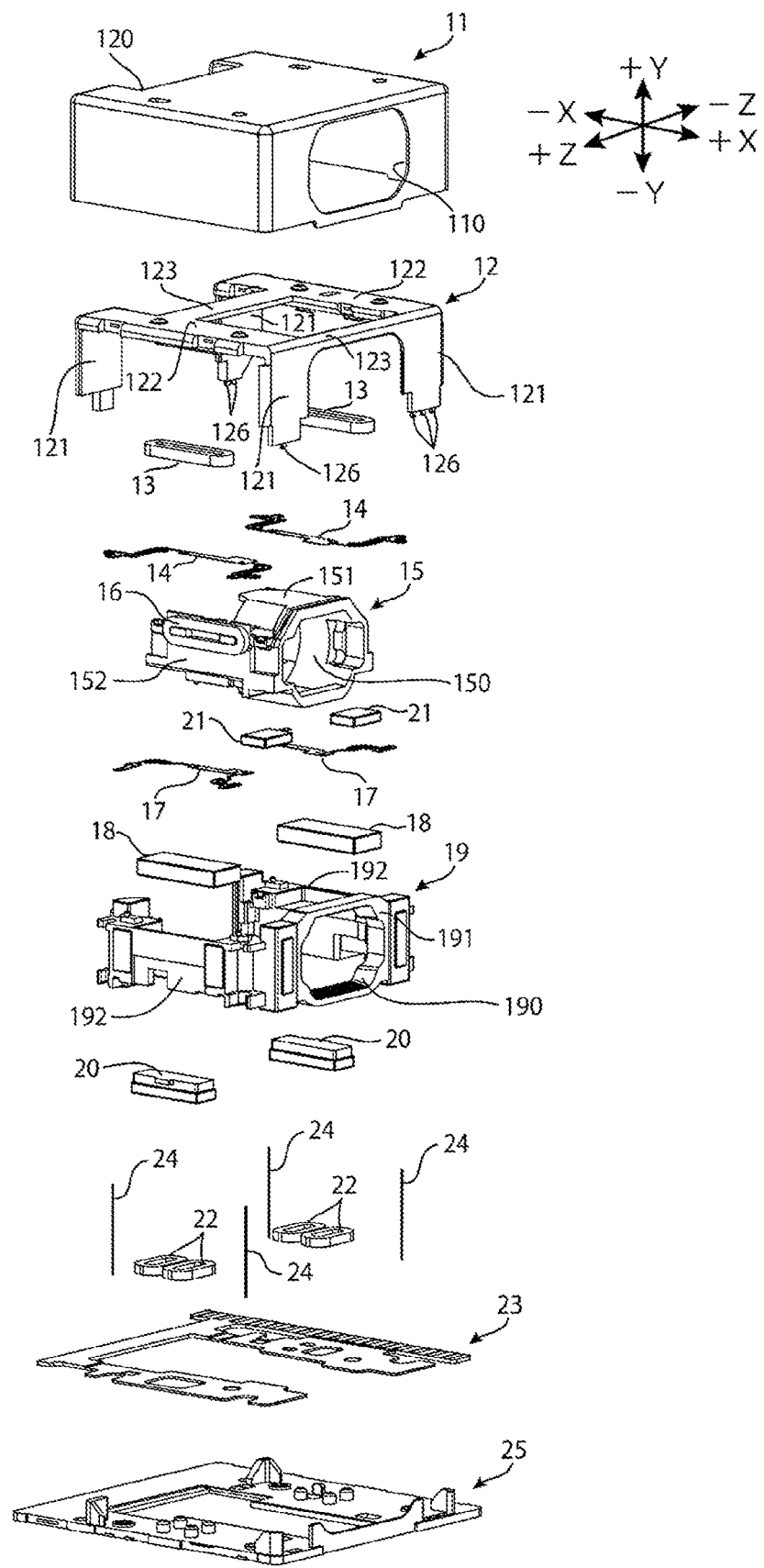
FIG. 3 is an exploded perspective view of the lens driving device shown in FIG. 2.
Figure 4:
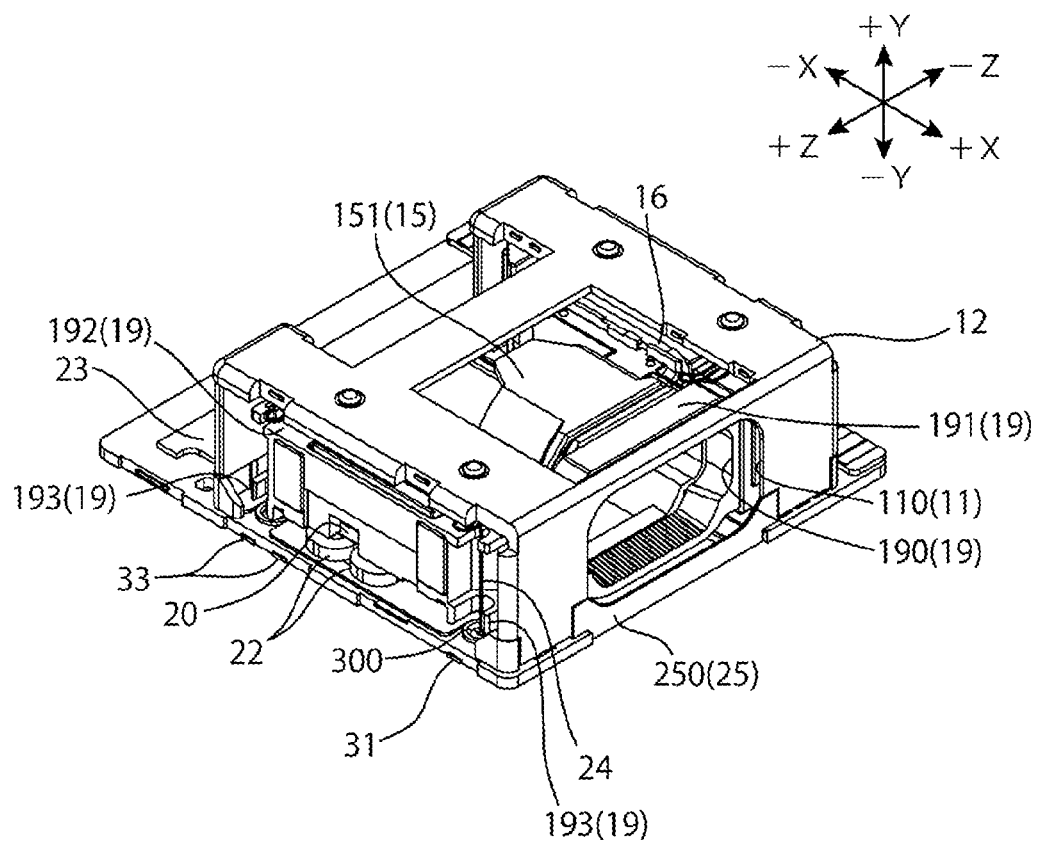
FIG. 4 is a perspective view in which the case is removed from the lens driving device shown in FIG. 2.

As shown in FIG. 3, the lens driving device 1 has a case 11, a frame 12, first coils for OIS (Optical Image Stabilizer) 13, upper side leaf springs 14, a carrier 15, second coils for OIS 16, lower side leaf springs 17, magnets for OIS 18, a holder 19, magnets for AF (Auto Focus) 20, magnets for detection 21, coils for AF 22, an FPC (flexible printed circuit board) 23, suspension wires 24, and a base 25. Among these, the carrier 15, the second coils for OIS 16, and the magnets for detection 21 constitute a movable portion. In addition, the magnets for OIS 18, the holder 19, and the magnets for AF 20 constitute an intermediate member. In addition, the case 11, the frame 12, the first coils for OIS 13, the coils for AF 22, the FPC 23, and the base 25 constitute a fixed portion.

The movable portion is supported by the holder 19 of the intermediate member via the upper side leaf springs 14 and the lower side leaf springs 17. The movable portion is movable in the Y direction with respect to the intermediate member. The intermediate member is supported by the base 25 of the fixed portion via the suspension wires 24. The intermediate member together with the movable portion it supports can move in the X direction and the Z direction with respect to the fixed portion. Thus, the movable portion is movable in the X direction, the Y direction and the Z direction with respect to the fixed portion. In addition, the first coils for OIS 13, the second coils for OIS 16, the magnets for OIS 18, the magnets for AF 20, and the coils for AF 22 are driving sources for moving the lens body 5 with respect to the base 25.

Figure 2:
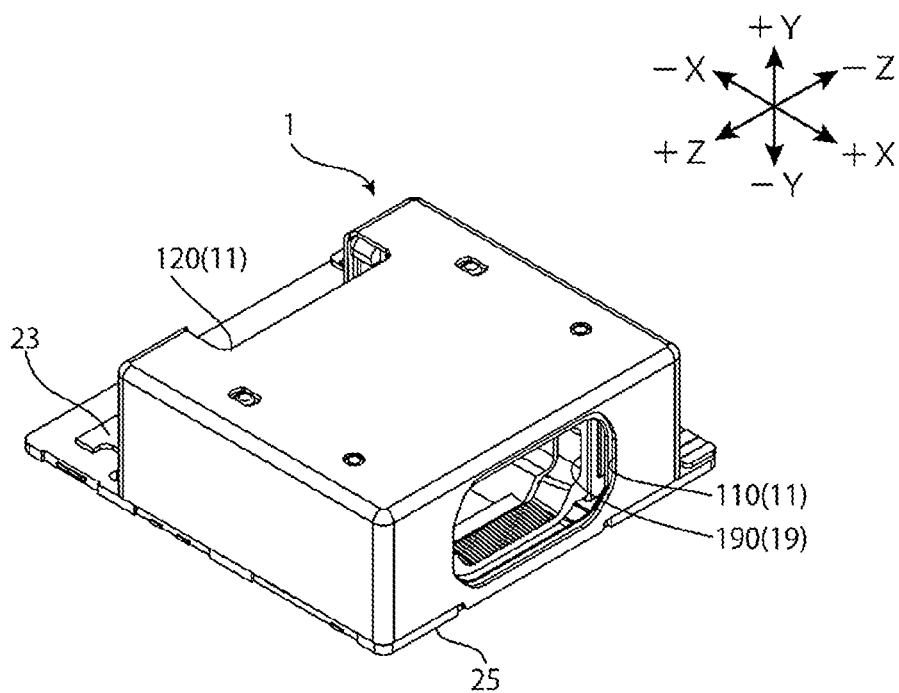
FIG. 2 is a perspective view of the lens driving device shown in FIG. 1.

As shown in FIG. 2, the case 11 and the base 25 are combined as a housing. A first opening 110 is provided in the center of the rear side wall of the case 11. A second opening 120 is provided in a portion ranging from the center of the front side wall to the upper side wall of the case 11.

Figure 6A:
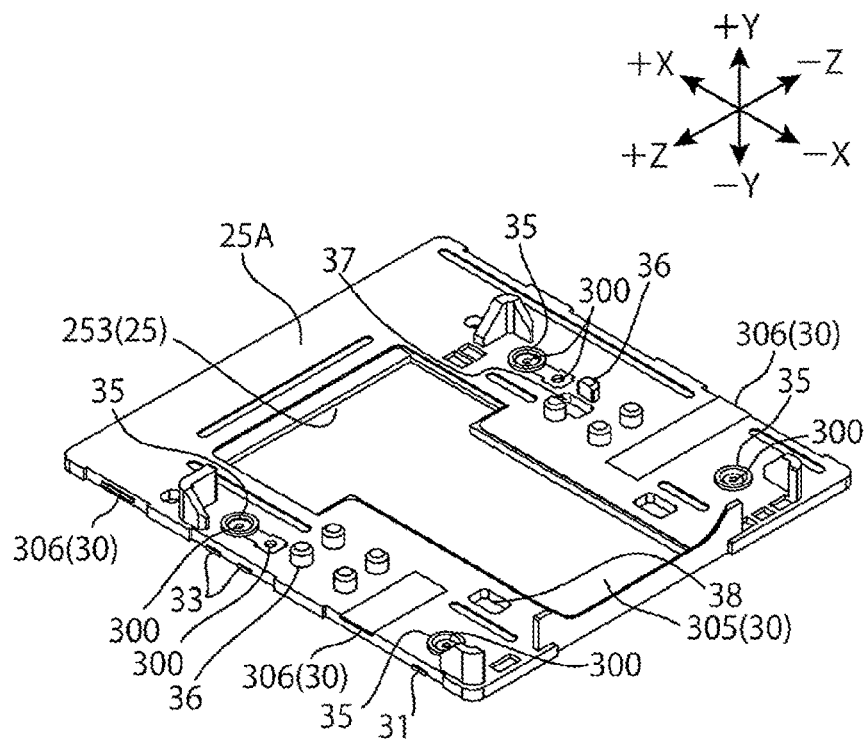
FIG. 6A is a perspective view showing a base shown in FIG. 4.

As shown in FIG. 6A, the base 25 is formed by molding the main body 25A of the base 25 with resin in a state where the metal plate member 30, the first metal members 31, and 33 are arranged in the resin. A rising portion 250 rising up to the upper side is provided at an edge on the rear side of the base 25. An FPC 23, which is a flexible printed circuit board, is arranged on the base 25.

An opening portion 253 is provided in the center of the resin main body 25A of the base 25 corresponding to the carrier 15. The opening portion 253 has a T-shape with an expanded front side. The metal plate member 30 is embedded in the resin main body 25A so as to block the opening portion 253. A black layer is formed on the surface of the metal plate member 30.

Figure 6B:
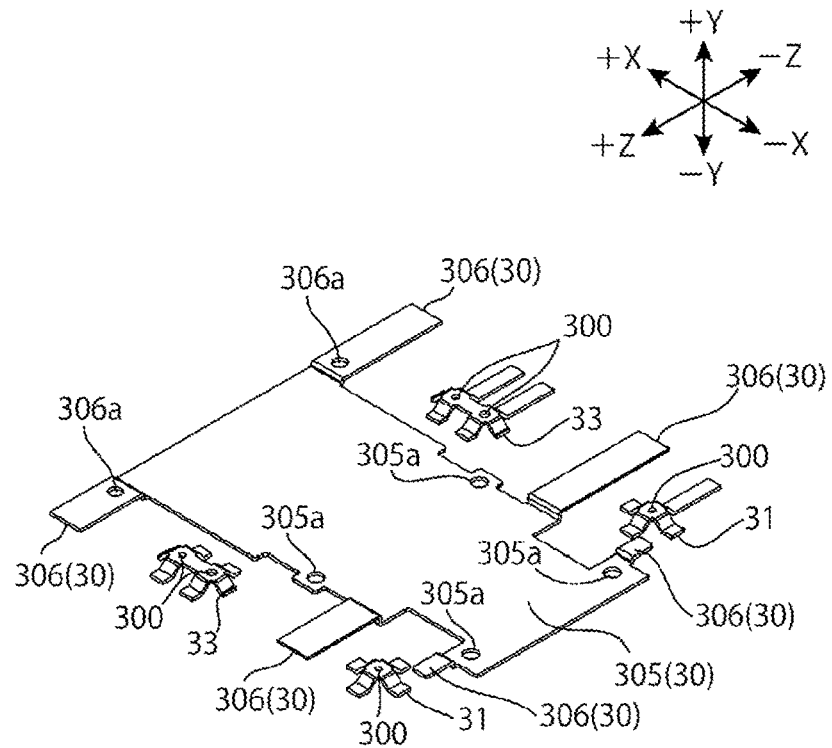
FIG. 6B is a perspective view showing a metal plate member and first metal members embedded in a resin main body of the base.
Figure 7A:
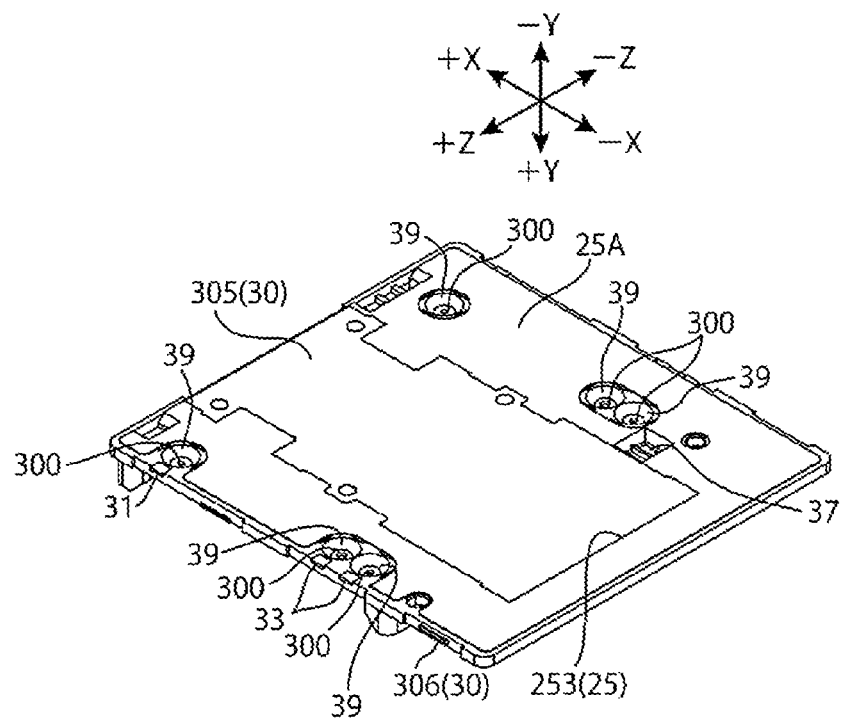
FIG. 7A is a perspective view of FIG. 6A as viewed from the opposite side.
Figure 7B:
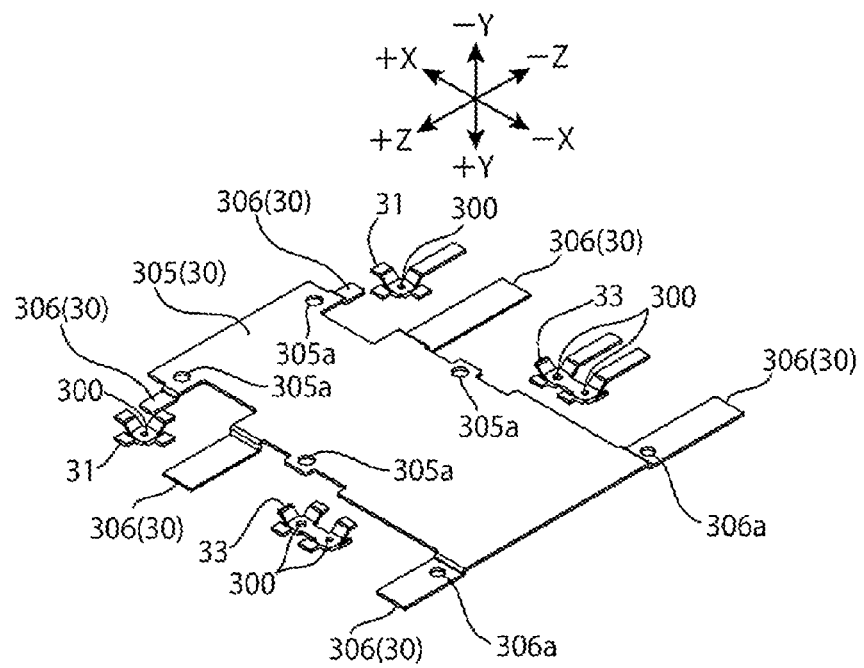
FIG. 7B is a perspective view of FIG. 6B as viewed from the opposite side.

As shown in FIG. 6B, the metal plate member 30 has a base portion 305 and three pairs of arm portions 306. The base portion 305 is the main body portion of the metal plate member 30, and the outer edge thereof is entirely located outside the opening portion 253 to prevent light from entering from the outside. The arm portions 306 are bent upward with respect to the base portion 305 and then extend to the left and right sides. One pair of arm portions 306 on the foremost side have through holes 306a penetrating in the up-down direction at the roots thereof, and are covered by the resin of the main body 25A of the base 25, at the same time, the tip ends of the arm portions 306 are exposed to the outside from the side surfaces of the resin main body 25 A of the base 25. The upper surfaces and the tip ends of one pair of arm portions 306 in the middle are exposed from the resin main body 25A of the base 25. One pair of arm portions 306 on the rearmost side are entirely covered by the resin of the main body 25A of the base 25. In addition, the base portion 305 is provided with through holes 305a penetrating in the up-down direction at the left and right ends at the center in the front-rear direction and the left and right ends at the rear end. The resin of the main body 25A of the base 25 and the metal plate member 30 are firmly joined by three pairs of arm portions 306 and three pairs of through holes 305a, 306a. As shown in FIG. 7A, the lower surface of the metal plate member 30 and the lower surface of the resin main body 25A are formed flush with each other. Since the metal plate member 30 is thinner than the main body 25A of the base 25, the upper surface of the metal plate member 30 is lower than the upper surface of the resin main body 25A, as shown in FIG. 6A. The metal plate member 30 is exposed on the upper surface and the lower surface at the position of the opening portion 253. The lower surface of the carrier 15 directly opposes to the upper surface of the metal plate member 30. In addition, the lower surface of the carrier 15 is lower than the upper surface of the resin main body 25A. When there is a black layer on the surface of the metal plate, the conductivity and the solderability may be often poor, so the first metal members 31 with good conductivity and solderability are embedded in the base 25.

The first metal member 31 is shaped like a cross shape with four arm portions and a crossing portion. The first metal member 33 has six arm portions, one connection arm portion and two crossing portions, and has such a shape that two crosses are connected. The first metal member 31 is provided with one through hole 300 penetrating in the up-down direction at the crossing portion, and the first metal member 33 is provided with one through hole 300 penetrating in the up-down direction at each of the two crossing portions. Each of the arm portions around the through holes 300 of the first metal members 31, 33 is bent obliquely downward except for the connection arm portion, and each tip end portion of the arm portions is further bent so as to be horizontal. The connection arm portion is not bent.

As shown in FIGS. 6A and 7A, the crossing portion of the first metal member 31 with one through hole 300 and the crossing portions of the first metal member 33 with two through holes 300 are exposed from the base 25 on both the upper and the lower surfaces. The tip end portions of the arm portions on the left side of the first metal members 31, 33 on the left side and the tip end portions of the arm portions on the right side of the first metal members 31, 33 on the right side are exposed from the base 25.

As shown in FIG. 6A, receiving portions 35 for receiving a damper gel are formed in the upper surface of the base 25. The receiving portions 35 are formed so as to surround the peripheries of the through holes 300 of the first metal members 31 and the peripheries of the through holes 300 on the front sides of the two through holes 300 of the first metal members 33 by walls, respectively. The damper gel is a resin with viscoelasticity and has the function of attenuating vibration.

As shown in FIG. 7A, solder accommodation cavities 39 are formed in the lower surface of the base 25. The accommodation cavities 39 are formed by being recessed in a truncated cone shape centered about the through holes 300 in the cavities formed by the first metal members 31 and 33.

The lower ends of the suspension wires 24 are passed through the through holes 300 on the front sides of the first metal members 33 and the through holes 300 of the first metal members 31. The suspension wires 24 penetrate the base 25 and are soldered to the crossing portions on the front sides of the first metal members 33 and the crossing portions of the first metal members 31 from the lower surface by the solder of the accommodation cavities 39. The suspension wires 24 are thereby joined and fixed to the first metal members 31, 33 and are electrically connected to the first metal members 33.

A Hall element for X direction detection and a Hall element for Y direction detection as electric components are attached to the lower surface of the FPC 23. As shown in FIG. 6A, the base 25 is provided with an accommodation cavity 37 for accommodating the Hall element for X direction detection and an accommodation cavity 38 for accommodating the Hall element for Y direction detection. Convex portions 36 are provided on the left side and the right side of the upper surface of the base 25. The coil for AF 22 is wound around the convex portion 36 on the upper surface of the FPC 23.

The frame 12 is formed by molding the main body of the frame 12 with resin in a state where the second metal members 126 are arranged in the resin. The end portions of the second metal members 126 protrude from the lower end portions of the frame 12. The second metal members 126 form electric wirings and serve both for reinforcing the frame 12 and for electric wiring. The lower end portions of the frame 12 are fixed to the base 25. The protruding end portions of the second metal members 126 are electrically connected to the FPC 23.

The frame 12 has two rising portions 121 rising up from the left side of the base 25, two rising portions 121 rising up from the right side of the base 25, left and right horizontal portions 122 connecting the two rising portions 121 on the left and right respectively, and connection portions 123 connecting the left and right horizontal portions 122. The two rising portions 121 oppose to each other in the optical axis direction. A first coil for OIS 13 and a Hall element for Z direction detection as electric components are provided on the lower surface of the horizontal portion 122 on the right side of the frame 12, and are electrically connected to the second metal member 126, respectively. A first coil for OIS 13 as an electric component is provided on the lower surface of the horizontal portion 122 on the left side of the frame 12, and is electrically connected to the second metal member 126.

Figure 5:
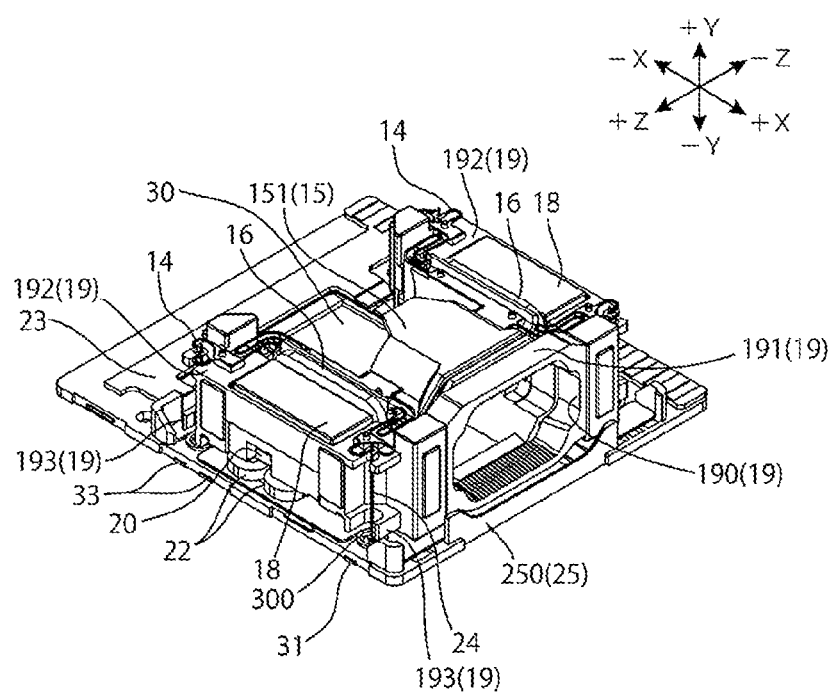
FIG. 5 is a perspective view in which the frame is removed from lens driving device shown in FIG. 4.

As shown in FIG. 5, the holder 19 has a frame portion 191 surrounding the holder opening 190, and first wall portions 192 extending forward from the left and right peripheral portions of the frame portion 191. U-shaped recess portions 193 opened in the Z direction are provided at lower ends of the front, rear, left and right corner portions of the first wall portions 192. A magnet for OIS 18 is provided on the upper surface of the first wall portion 192. A magnet for AF 20 is provided on the lower surface of the first wall portion 192. The upper side leaf springs 14 are fixed to the upper surface of the holder 19, and the lower side leaf springs 17 are fixed to the lower surface of the holder 19. The upper side leaf springs 14 are formed in a wire shape extending while meandering inward from the front, rear, left and right on the upper side of the holder 19. The lower side leaf springs 17 are formed in a wire shape extending while meandering inward from the front, rear, left and right on the lower side of the holder 19.

As shown in FIG. 3, the carrier 15 is a lens supporting body that supports the lens body 5. The carrier 15 has a cylindrical body 151 and second wall portions 152 extending forward from the peripheral edge portions on the left side and the right side of the cylindrical body 151. The second wall portions 152 are formed by cutting off the upper side portion and the lower side portion at the front portion of the cylindrical body 151. A through hole 150 is provided in the cylindrical body 151. The through hole 150 and an inner edge forming the through hole 150 are an attachment portion of the lens body 5. After the lens driving device 1 is completed, the lens body 5 is fitted into the through hole 150 from between the left and the right second wall portions 152 of the carrier 15 and attached to the carrier 15. The front, rear, left and right of the upper side of the carrier 15 are supported by the upper side leaf springs 14, and the front, rear, left and right of the lower side of the carrier 15 are supported by the lower side leaf springs 17. The gravity center of the movable portion including the lens body 5 and the carrier 15 that supports the lens body 5 is located approximately at the center of the front, rear, left and right upper side leaf springs 14 and the lower side leaf springs 17.

The second coils for OIS 16 are provided on the outer surfaces of the left and right second wall portions 152 of the carrier 15. The magnets for detection 21 are provided on the lower surface of the rear portion of the second wall portion 152. In addition, the connection portions 123 of the frame 12 are provided at portions where the upper portion of the cylindrical body 151 is cut off, and the cylindrical body 151 and the connection portions 123 overlap when viewed from the X direction.

As shown in FIG. 5, the suspension wire 24 passes through the U-shaped recess portion 193 of the holder 19, and is bridged between the through hole 300 of the base 25 and the upper side leaf spring 14. The upper end of the suspension wire 24 is inserted into the tip end portion of the upper side leaf spring 14 and soldered to the tip end portion which is formed in a ring shape on the outer side of the holder 19.

Damper gel (not shown) is arranged between the lower end portion of the suspension wire 24 and the U-shaped recess portion 193 of the holder 19 and the receiving portion 35 of the base 25. The U-shaped recess portion 193 is provided at an interval directly above the receiving portion 35 and forms a damper gel reservoir together with the receiving portion 35.

The second coil for OIS 16 that constitutes the movable portion and the magnet for OIS 18 that constitutes the intermediate member oppose to each other. When an electric current flows in the second coil for OIS 16, an electromagnetic force in the Y direction is generated in the second coil for OIS 16, and the movable portion moves in the Y direction with respect to the intermediate member. The Hall element for Y direction detection detects the magnetic field of the opposing magnet for detection 21 and outputs a signal indicating the detection result. This signal corresponds to the position of the magnet for detection 21 in the Y direction with respect to the Hall element for Y direction detection.

The magnet for OIS 18 that constitutes the intermediate member and the first coil for OIS 13 that constitutes the fixed portion oppose to each other. When an electric current flows in the first coil for OIS 13, an electromagnetic force in the Z direction is generated in the first coil for OIS 13 and a reaction force is generated in the magnet for OIS 18. The intermediate member moves in the Z direction with respect to the fixed portion. The Hall element for Z direction detection detects the magnetic field of the opposing magnet for OIS 18 and outputs a signal indicating the detection result. This signal corresponds to the position of the magnet for OIS 18 in the Z direction with respect to the Hall element for Z direction detection.

The magnet for AF 20 that constitutes the intermediate member and the coil for AF 22 that constitutes the fixed portion oppose to each other. When an electric current flows in the coil for AF 22, an electromagnetic force in the X direction is generated in the coil for AF 22, and a reaction force is generated in the magnet for AF 20. The intermediate member moves in the X direction with respect to the fixed portion. The Hall element for X direction detection detects the magnetic field of the opposing magnet for detection 21 and outputs a signal indicating the detection result. This signal corresponds to the position of the magnet for detection 21 in the X direction with respect to the Hall element for X direction detection.

The lens driving device 1 according to the present embodiment comprises: a carrier 15 with an attachment portion for attaching the lens body 5; and a base 25 having a resin main body 25A and a metal plate member 30 embedded and formed in the resin main body 25A and movably supporting the carrier 15. An opening portion 253 is provided in the center of the resin main body 25A corresponding to the carrier 15. The metal plate member 30 is provided so as to block the opening portion 253. In the opening portion 253, the carrier 15 directly opposes to the metal plate member 30. Thus, it is possible to provide a lens driving device 1 in which the base 25 can be thinned in the periscopic type.

It is to be noted that in the above embodiment, the metal plate member 30 may not be entirely black, and only the portion of the metal plate member 30 exposed from the T-shaped opening portion 253 may be black.

In addition, the lower surface of the metal plate member 30 may not be flush with the lower surface of the resin main body 25A, and may be higher than the lower surface of the resin main body 25A.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A lens driving device comprising:
a carrier with an attachment portion for attaching a lens body; and
a base comprising a resin main body and a metal plate member embedded in the resin main body and movably supporting the carrier,
wherein an opening portion is provided in a center of the resin main body, the metal plate member is provided so as to block the opening portion, and in the opening portion, the carrier directly opposes to the metal plate member, and
wherein a black layer is formed on an upper surface of at least a portion of the metal plate member exposed from the opening portion.

2. The lens driving device according to claim 1, wherein a lower surface of the metal plate member is flush with a lower surface of the resin main body and an upper surface of the metal plate member is lower than an upper surface of the resin main body.

3. The lens driving device according to claim 1, wherein a lower surface of the carrier directly facing the metal plate member is lower than an upper surface of the resin main body.

4. The lens driving device according to claim 1, wherein an outer edge of a base portion of the metal plate member is entirely outside the opening portion.

5. The lens driving device according to claim 1, wherein a metal member for soldering, separately from the metal plate member, is embedded in the resin main body.

6. A camera device comprising the lens driving device of claim 1.

7. An electronic apparatus comprising the camera device of claim 6.

8. A lens driving device, comprising:
a carrier with an attachment portion for attaching a lens body; and
a base comprising a resin main body and a metal plate member embedded in the resin main body and movably supporting the carrier,
wherein
an opening portion is provided in a center of the resin main body, the metal plate member is provided so as to block the opening portion, and in the opening portion, the carrier directly opposes to the metal plate member, and
wherein the metal plate member comprises arm portions that are bent upward with respect to a base portion and extend to a left side and a right side, and tip ends of the arm portions are exposed from side surfaces of the resin main body.

9. The lens driving device according to claim 8, wherein a lower surface of the metal plate member is flush with a lower surface of the resin main body and an upper surface of the metal plate member is lower than an upper surface of the resin main body.

10. The lens driving device according to claim 8, wherein a lower surface of the carrier directly facing the metal plate member is lower than an upper surface of the resin main body.

11. The lens driving device according to claim 8, wherein an outer edge of a base portion of the metal plate member is entirely outside the opening portion.

12. The lens driving device according to claim 8, wherein a metal member for soldering, separately from the metal plate member, is embedded in the resin main body.

13. A camera device comprising the lens driving device according to claim 8.

14. An electronic apparatus comprising the camera device according to claim 13.

15. A lens driving device, comprising:
a carrier with an attachment portion for attaching a lens body; and
a base comprising a resin main body and a metal plate member embedded in the resin main body and movably supporting the carrier,
wherein
an opening portion is provided in a center of the resin main body, the metal plate member is provided so as to block the opening portion, and in the opening portion, the carrier directly opposes to the metal plate member, and
wherein the metal plate member is provided with a through hole penetrating in an up-down direction, and the through hole is embedded in the resin main body.

16. The lens driving device according to claim 15, wherein a lower surface of the metal plate member is flush with a lower surface of the resin main body and an upper surface of the metal plate member is lower than an upper surface of the resin main body.

17. The lens driving device according to claim 15, wherein a lower surface of the carrier directly facing the metal plate member is lower than an upper surface of the resin main body.

18. The lens driving device according to claim 15, wherein an outer edge of a base portion of the metal plate member is entirely outside the opening portion.

19. The lens driving device according to claim 15, wherein a metal member for soldering, separately from the metal plate member, is embedded in the resin main body.

20. A camera device comprising the lens driving device according to claim 2.

21. An electronic apparatus comprising the camera device according to claim 20.

* * * * *

UNITED STATES PATENT AND TRADEMARK OFFICE
CERTIFICATE OF CORRECTION

PATENT NO. : 12,197,031 B2
APPLICATION NO. : 17/548935
DATED : January 14, 2025
INVENTOR(S) : Noriyuki Washio and Tomoyoshi Yano It is certified that error appears in the above-identified patent and that said Letters Patent is hereby corrected as shown below:

In the Claims

Column 8, Claim 20, Line 58, "claim 2", should be --claim 15--.

Signed and Sealed this
Twenty-second Day of July, 2025

Coke Morgan Stewart
*Acting Director of the United States Patent and Trademark Office*